United States Patent [19]

Harned

[11] Patent Number: 4,873,462

[45] Date of Patent: Oct. 10, 1989

[54] STEPPING MOTOR WITH LOW DETENT TORQUE

[75] Inventor: Timothy J. Harned, East Kingston, N.H.

[73] Assignee: Eastern Air Devices, Inc., Dover, N.H.

[21] Appl. No.: 245,787

[22] Filed: Sep. 16, 1988

[51] Int. Cl.⁴ .............................................. H02K 37/00
[52] U.S. Cl. .................................. 310/49 R; 310/162
[58] Field of Search ................... 310/49 R, 156, 162, 310/165

[56] References Cited

U.S. PATENT DOCUMENTS

| | | | |
|---|---|---|---|
| 2,589,999 | 3/1952 | Feiertag et al. | 172/275 |
| 2,982,872 | 5/1961 | Fredrickson | 310/163 |
| 3,343,014 | 9/1967 | Giles | 310/49 |
| 4,025,810 | 5/1977 | Field | 310/162 |
| 4,112,319 | 9/1978 | Field | 310/49 R |
| 4,385,250 | 5/1983 | Welburn | 310/162 |
| 4,424,463 | 1/1984 | Musil | 310/49 R |
| 4,516,048 | 5/1985 | Brigham | 310/254 |

Primary Examiner—Patrick R. Salce
Assistant Examiner—Judson H. Jones
Attorney, Agent, or Firm—Lahive & Cockfield

[57] ABSTRACT

A synchronous motor having peripheral teeth on the rotor magnetized by a permanent magnet and radially inwardly projecting, electromagnetically energized stator teeth. The rotor teeth and stator teeth are skewed relative to each other. The annular arc length subtended by the skew as projected on the cylindrical peripheral envelope of the rotor teeth equals the arc length corresponding to the angular pitch of the rotor teeth divided by an integer between two and four. Each of the rotor teeth projects upon two adjacent stator teeth, and/or each of the stator teeth projects upon two adjacent rotor teeth.

17 Claims, 3 Drawing Sheets

STEPPING MOTOR WITH LOW DETENT TORQUE

BRIEF SUMMARY OF THE INVENTION

This invention relates generally to synchronous motors, and in particular to hybrid stepping motors. Motors of this type typically have a rotor with peripheral teeth magnetized by a permanent magnet, and stator poles each having a plurality of inwardly-projecting teeth. The stator poles are electromagnetically energized. The rotor teeth are annularly spaced with an even angular pitch. The rotor is rotated synchronously with the electrical signals energizing the stator.

Motors of this general type are operated in either of two basic modes. One mode is the full or half step mode wherein the motor is stepped in integral multiples of a basic angular movement. A second mode, referred to as microstepping, consists in energizing the phases of the stator windings with sinusoidal and cosinusoidal currents that cause the magnetic field linked with the rotor to sweep smoothly rather than to move in discrete steps. The electronics required to implement microstepping are more expensive than those for the full or half step mode, but at lower speeds the motor operates more smoothly, is less sensitive to resonance problems and can be positioned anywhere between the integral multiples of the basic angular movement.

Motors of this type are often referred to as hybrid motors because they have characteristics associated with both permanent magnet motors and variable reluctance motors. Regardless of the mode of excitation, the motors are required to generate a predetermined torque in use. The torque is produced by the sum of two components. The electrical energization of the stator poles creates an energized or stator torque, and the permanent magnet creates a detent torque. The field produced by energization of the stator poles varies sinusoidally as the rotor teeth move relative to the stator teeth, having a maximum value each time the teeth are aligned. This produces a torque that varies sinusoidally through a complete cycle or period equal to the angular pitch of the rotor teeth. The detent torque results from the field produced by the permanent magnet. For example, with no stator pole excitation in a typical motor, the rotor will reach a position in which the rotor teeth are exactly aligned with the teeth of two stator poles. If the rotor is moved from that position until its teeth become exactly aligned with the teeth of another pair of stator poles, the angle or period moved will equal the tooth pitch divided by the number of pole pairs on the motor, and the resulting detent torque will have the same period. Because of manufacturing variations the energized and detent torques also have other components that are periodic every 7.2°, 45°, 90°, 180° and 360° of rotation.

A 1.8° hybrid stepping motor in common use in the motion control industry furnishes an example. This motor has 50 rotor teeth and 8 stator poles. The tooth pitch on the rotor, called the fundamental period, is 7.2° and the period of the detent torque is 1.8°, that is, the fourth harmonic.

The torque produced by the stator phases or poles is primarily responsible for making the motor a useful device. When the motor is energized in the full step mode, the period of the detent torque equals one full step. Over one step the average detent torque is zero, hence the detent torque does not contribute to the torque available to move the motor and its load. It is, however, a torque disturbance that can cause vibration and noise in the motor or device being moved. In the microstep mode, the detent torque causes the rotating magnetic field to have a position and velocity oscillation about the desired position and velocity, as controlled by the sinusoidal and cosinusoidal phase inputs. This results in a speed ripple at low shaft velocities as well as vibration and noise.

In the microstepping mode it is possible to compensate for the detent torque by adding higher order harmonics to the stator winding current waveforms. This eliminates the position and velocity oscillation, although the magnetic stiffness of the system is not constant and the cost of the electronics is increased.

The detent torque has other advantages and disadvantages depending upon the specific application. When it is desirable to deenergize the motor between movements, the detent torque provides a small torque to hold the load in its present position. However, for some applications such as an automotive throttle control, the detent torque acts against the mechanical return springs that shut down the throttle in case of electrical system failure.

There are many applications in which it is advantageous to reduce or eliminate the detent torque. One of the known techniques is to adjust the angular spacing of the rotor and stator teeth, and is exemplified by motors having a 50/48 tooth ratio between the rotor and stator. Because of manufacturing constraints, it is not possible to completely eliminate the detent torque by this method.

A second method is to vary the shape of the rotor or stator teeth. Although this partially reduces the detent torque, it may significantly alter the sinusoidal shape of the torque curve, in effect introducing a third harmonic.

U.S. Pat. No. 4,025,810, dated May 24, 1977, discloses a synchronous hybrid stepping motor of the general type described above, which has rotor and stator teeth that are skewed relative to each other for the purpose of reducing noise and vibration. The skew of the teeth is described as at least 10% of the tooth width. Either the rotor teeth or the stator teeth may be skewed. In any case the patent discloses that two conditions must be satisfied, namely that (1) each rotor tooth must not overlap two adjacent stator pole teeth, and (2) each stator pole tooth must not overlap two adjacent rotor teeth. According to the patent, these conditions are necessary in order to prevent a loss of torque that would otherwise occur because the coupling between a single rotor or stator tooth and two adjacent opposing stator or rotor teeth, respectively, would produce forces upon the rotor in opposite directions.

It has been found in many instances that when the angle of skew is limited so that there is no overlapping of rotor teeth by stator teeth or stator teeth by rotor teeth, detent torques corresponding to the fourth harmonic and harmonics that are lower than the fourth cannot be completely eliminated. This has proven disadvantageous in some modes of operation of 1.8 degree hybrid stepping motors in which the detent torque corresponds to the fourth harmonic. For example, speed variations would occur when the motor was energized by a constant frequency, sinusoidal voltage. When the motor was energized by a variable frequency, sinusoidal current, as in microstepping, the harmonic terms would reduce the positional accuracy and positional stiffness, and cause velocity variations. When the motor was energized by a variable frequency, square wave voltage or current, as in full or half stepping, the harmonic terms would reduce the positional accuracy with two phases energized.

An object of this invention is to improve stepping motors by eliminating detent torques that are the fourth or lower harmonics of the fundamental, without substantially increasing other harmonics.

A second object is to decrease speed variation when the stator is energized by a constant frequency, sinusoidal voltage.

A further object is to increase the positional accuracy and stiffness and to decrease speed variation when the motor is energized with variable frequency, sinusoidal current.

A still further object is to increase positional accuracy when the motor is energized with variable frequency, square wave voltage or current.

With the above and other objects in view, as hereinafter more fully explained, the features of this invention include a motor construction in which the rotor teeth and stator teeth are skewed relative to each other. The annular arc length subtended by the skew as projected on the imaginary cylindrical surface or peripheral envelope of the rotor teeth equals the arc length corresponding to the pitch of the rotor teeth divided by four or a lower integer greater than one corresponding to the number of the harmonic to be eliminated. In certain embodiments this criterion is ideally reached with each of the rotor teeth projecting upon two adjacent stator teeth, and/or each of the stator teeth projecting upon two adjacent rotor teeth.

According to one embodiment of the invention, the rotor is constructed of two segments longitudinally spaced on the rotor axis. The teeth of the stator are parallel to the rotor axis, and the teeth of each rotor segment are skewed.

According to another embodiment, the teeth of the rotor segments are parallel to the rotor axis, and the teeth of the stator comprise segments respectively opposing the rotor segments and are skewed.

In each of the above embodiments the teeth of one rotor or stator segment are angularly displaced by one half tooth pitch relative to the corresponding teeth of the other rotor or stator segment. Thus, if the teeth of each rotor segment are parallel to the rotor axis and the teeth of one rotor segment are angularly displaced by one half tooth pitch relative to the teeth of the other rotor segment, the teeth of both stator segments are aligned, with the teeth of each stator segment being skewed.

In each of the above embodiments, the angular extent of the rotor and stator skews equals the angular period of the harmonic to be eliminated.

DESCRIPTION OF PREFERRED EMBODIMENTS

Figure 1:
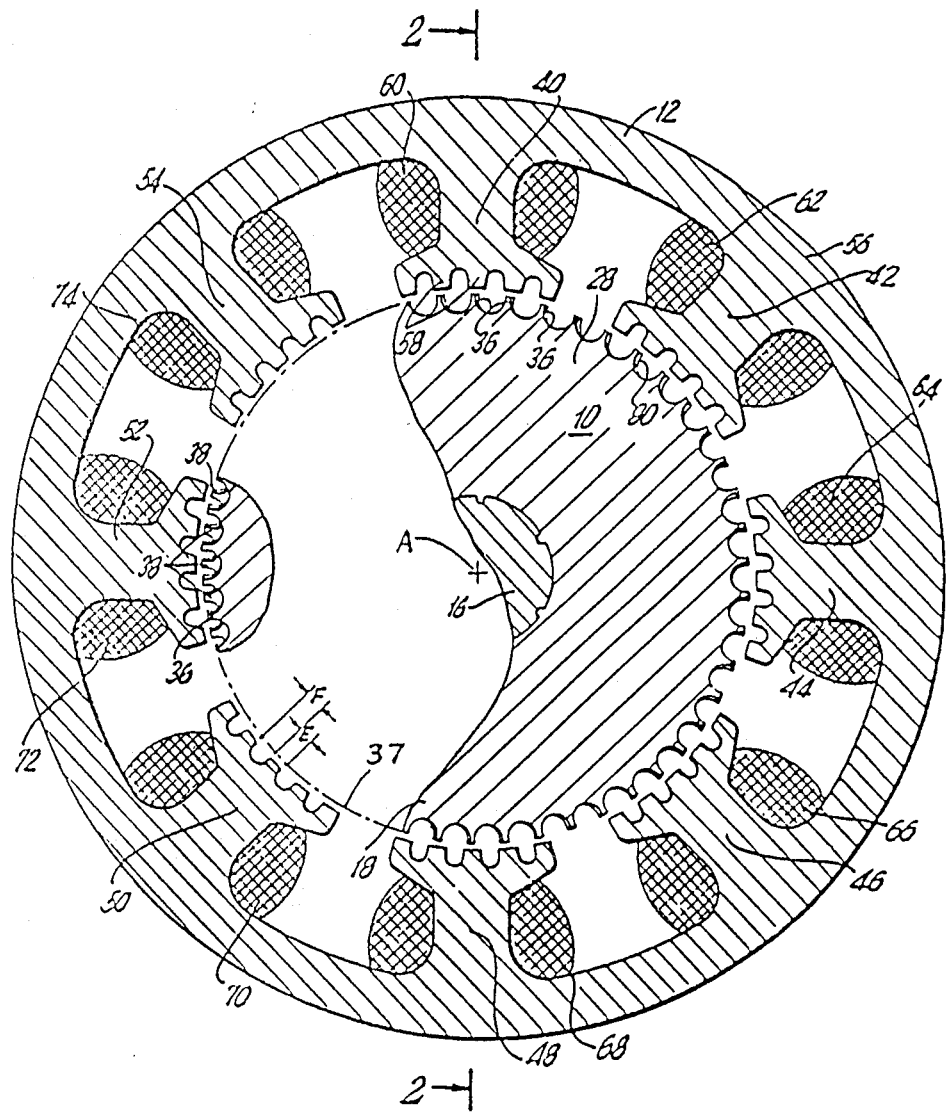
FIG. 1 is a simplified cross section transverse to the axis of a stepping motor embodying the invention.
Figure 2:
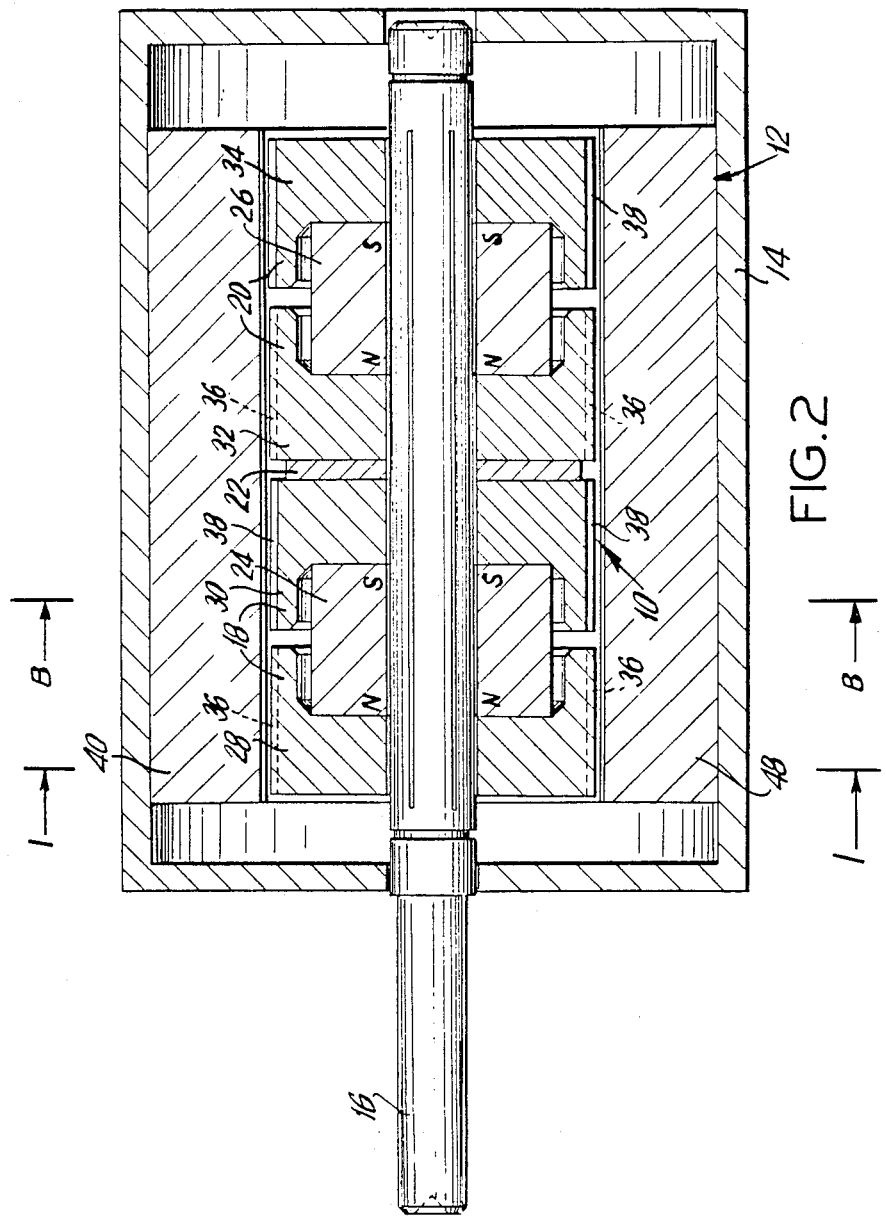
FIG. 2 is a longitudinal elevation in section taken on line 2—2 of FIG. 1.
Figure 3:
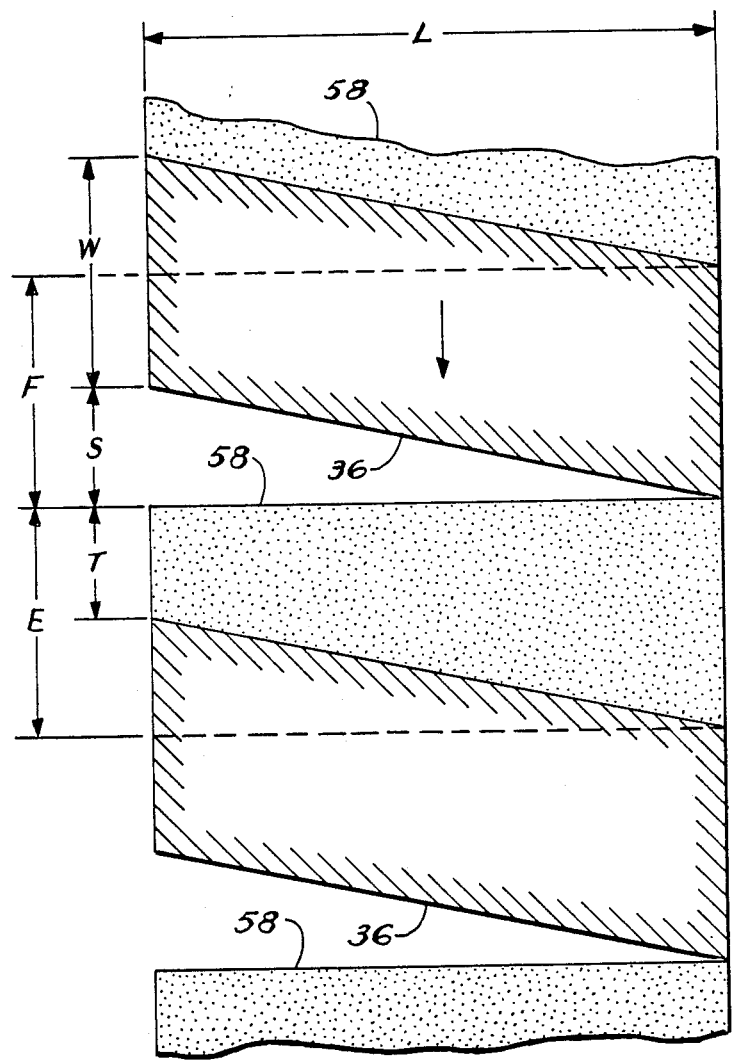
FIG. 3 is a diagrammatic representation of the rotor and stator teeth illustrating features of the invention.

A presently preferred embodiment of this invention is constructed the same as the motor described in connection with FIGS. 1 to 3 of said U.S. Pat. No. 4,025,810, except for certain structural features described below. As shown in FIGS. 1 and 2, a rotor 10 rotates within a stator 12, the stator being fitted within a housing 14. A rotor shaft 16 having an axis A projects through the housing and is keyed to the rotor for rotation therewith. Suitable bearings (not shown) support the rotor and shaft rotatably within the housing 14.

The rotor 10, as illustrated, consists of two identical, axially displaced rotor sections 18 and 20. A non-magnetic spacer 22 separates the sections 18 and 20 from one another. The section 18 has a permanent magnet 24 and the section 20 has a permanent magnet 26. The magnets 24 and 26 are axially magnetized to have north and south poles respectively designated "N" and "S", as shown. Cap-shaped rotor pole shoes 28 and 30 encapsulate the magnet 24, and identical rotor pole shoes 32 and 34 encapsulate the magnet 26. Each of the pole shoes defines a rotor segment having the polarization of the end of the magnet that it encapsulates.

FIG. 1 illustrates the structure of the rotor segment 28, the segments 30, 32 and 34 being preferably of identical construction. The segment 28 has 50 uniformly annularly spaced teeth 36 each projecting radially to an edge extremity lying in a cylindrical peripheral surface envelope 37 coaxial with the axis A of the rotor. Therefore, the angular pitch of the rotor, that is the angular displacement between like points on adjacent rotor teeth 36, is 7.2°. As shown in FIG. 2 the entire segment 28 and all of the teeth 36 are magnetized by the permanent magnet 24 to exhibit a north polar magnetization. The teeth 36 are spaced uniformly about the entire periphery of the rotor segment 28. Each of the teeth 36 extends longitudinally in the axial direction of the rotor, and is skewed from parallelism with the axis A as further described below.

As stated above, the structure of the rotor segment 30 is identical to that of the segment 28 and includes radially projecting, annularly spaced teeth 38. As described in said patent, the segment 30 is keyed to the shaft 16 so that its teeth are angularly displaced from the teeth 36 of the segment 28 by one-half tooth pitch so that they appear, when viewed axially as in FIG. 1, midway between the teeth 36. This is shown for a few of the teeth in the left hand portion of the rotor in FIG. 1. For simplicity, in FIG. 1 only a few of the teeth 38 are illustrated, but in fact the teeth 38 are uniformly spaced about the entire periphery of the segment 30.

The segments 32 and 34 are identical to the segments 28 and 30 and have the same relative angular displacement. Therefore, for simplicity the teeth of the segments 32 and 34 of the section 20 are identified by the same reference numerals as the teeth of the segments 28 and 30 of the section 18. The sections 18 and 20 are identical. If desired, a motor according to this invention may be constructed with only one or more than two of the sections 18 or 20.

As shown in FIG. 1, eight uniformly angularly spaced poles 40, 42, 44, 46, 48, 50, 52 and 54 project radially inwardly from a common circumscribing stator portion 56 to form the stator 12. The poles each extend longitudinally along the entire axial dimension of the stator 12, having an axial length substantially equal to that of the rotor segments 28, 30, 32 and 34. In this embodiment five stator teeth 58 project radially inwardly toward the envelope 37 to form the radial ends of each of the stator poles. For purposes of reference it is convenient to refer to the projection of each of the stator teeth 58 on the cylindrical surface envelope 37.

The angular pitch of the stator teeth 58 on each pole is 7.2°, identical with the angular pitch of the rotor teeth.

The stator poles have their teeth annulary located so that if the rotor is in a position with its teeth 36 perfectly aligned with the teeth 58 of the pole 40 as shown in FIG. 1, the rotor teeth will also be perfectly aligned with the stator teeth of the opposite pole 48, and exactly between or completely out of alignment with the stator teeth of the poles 44 and 52. In the same position the rotor teeth are angularly displaced relative to the stator teeth of the poles 42, 46, 50 and 54 by one-half the angular displacement between the positions represented by the poles 40 and 44 and the positions represented by the poles 44 and 48, respectively, as described in said patent.

In this embodiment the pole teeth 58 extend longitudinally of the motor shaft from one end to the other of the rotor 10, and they are parallel to the rotor axis A. Because of the angular displacement of the segment 28 relative to the segment 30, when the teeth 58 on the poles 52 and 44 are completely out of alignment with the teeth 36 of the segment 28 at the section line 1—1 near the left end of the segment 28 as viewed in FIG. 2, they are completely aligned with the teeth 38 on the segment 30 at a section line B—B near the left extremity of the segment 30. At the same time the teeth 58 on the poles 40 and 48 are completely aligned with the teeth 36 on the segment 28 at the section line 1—1 and completely out of alignment with the teeth 38 on the segment 30 at the section line B—B.

In accordance with said patent, the stator poles are provided with windings 60, 62, 64, 66, 68, 70, 72 and 74 and the windings are energized by circuits (not shown) in any of the modes described in the prior art to magnetize the poles in sequence to cause motion of the rotor. Various modes of energization have been described and are well known in the art, including constant or variable frequency sinusoidal voltages with relative phase displacement from pole to pole and variable frequency square wave voltages with relative phase displacement from pole to pole. One specific example of a circuit for energizing the stator poles is described in said U.S. Pat. No. 4,025,810 and may be assumed herein for purposes of illustration.

In this embodiment the rotor teeth 36 and 38 of the segments 28 and 30 do not extend parallel to the axis A of the rotor, but are skewed as shown at 80 in FIG. 1. FIG. 3 illustrates the skew in exaggerated, diagrammatic form. In this figure the drawing surface represents the developed cylindrical surface envelope 37 with the teeth 36 of the segment 28 at this surface represented by shaded areas and the projections on this surface of the peripheral ends of the stator teeth 58 represented as stippled areas. All of the dimensions illustrated are measured as arc lengths in the surface 37. The rotor moves in the direction indicated by the arrow and the stator is stationary. The dimension W is the rotor tooth width. The dimension L is the longitudinal length of the rotor segment 28 and is parallel to the motor axis A. The dimension S is the width added to the tooth width W throughout its length due to the skewing. The dimension T represents the arc length corresponding to the rotor pitch, less the sum of the dimensions W and S. The dimension E is the stator tooth width and the dimension F is the arc displacement between stator teeth.

The present invention has particular application to motors having a detent torque corresponding to the fourth harmonic or a harmonic lower than the fourth. Accordingly, three conditions are satisfied. First, the dimension S is selected to be equal to the angular period of the harmonic to be eliminated. Thus $$S = \frac{W + S + T}{H}, \tag{1}$$

where H equals 2, 3 or 4.

Second, the skew has sufficient magnitude to cause each stator tooth to overlap two rotor teeth. Thus $$T < E \tag{2}$$

Third, the skew has sufficient magnitude to cause each rotor tooth to overlap two stator teeth. Thus $$F < W + S \tag{3}$$

The expressions (1), (2) and (3) are outside of the operative range of dimensions described in said U.S. Pat. No. 4,025,810. By satisfying these expressions it is possible to provide practical embodiments wherein, for example, the fourth harmonic or detent torque can be entirely eliminated. In practice, it has been found that this is achieved with no substantial reduction in the fundamental torque of the motor which results from the energization of the stator poles, and there is no increase in other harmonic torque components.

Elimination of the fourth harmonic or detent torque reduces the noise and vibration in both the full and half step modes of motor excitation, as well as in microstepping applications. Also in the microstepping mode, the position and velocity oscillations are reduced, and smoother low speed performance is obtained. In addition, if the motor torque is plotted against the angle of rotation, the curve is exhibited as nearly sinusoidal, and it is not necessary to add higher order harmonics to the microstepping current wave forms to reduce velocity oscillations. Therefore, the magnetic stiffness of the microstepped motor is more constant.

The invention therefore provides new design options by making available a hybrid stepping motor with very low detent torque. Microstepping motors having smooth and quiet operation over large speed ranges, and in particular with a significant reduction in velocity ripple at low speeds, have significantly advanced capabilities. For motors operated in the full or half step mode, the detent torque does not excite vibrations or create noise. For applications like the throttle control where it is advantageous to backdrive the motor mechanically, the elimination of the detent torque significantly reduces the force necessary to backdrive the motor.

In the above described embodiment, the stator teeth are parallel to the motor axis A and the rotor teeth are skewed. According to the principles described above, other embodiments may be constructed in which the rotor teeth are parallel to the motor axis and the stator teeth are skewed. Still other embodiments may be constructed in which both the rotor teeth and the stator teeth are skewed.

In any of the above embodiments, instead of providing that the teeth of the segment 28 are angularly displaced by one-half tooth pitch relative to the teeth of the segment 30, the teeth of both segments may be aligned and the stator teeth may be formed in axially displaced segments each having the length of a rotor segment, with the stator segments having their teeth angularly displaced by one-half tooth pitch relative to one another.

I claim:

1. A synchronous motor comprising, in combination,
    a rotor assembly including a cylindrical portion having an axis, said portion having a plurality of annularly spaced rotor teeth projecting radially to a cylindrical peripheral envelope on said axis,
    a stator assembly coaxial with said rotor assembly and having a plurality of radially projecting stator poles, said poles each having a plurality of stator teeth projecting radially toward said envelope, the rotor teeth each projecting radially upon two stator teeth,
    means for electrically energizing said stator poles,
    permanent magnet means in one of said assemblies for establishing a magnetic field at said rotor teeth, said rotor teeth and stator teeth each extending longitudinally along the stator poles and rotor portion, the plurality of rotor teeth and stator teeth being skewed relative to each other, the annular arc length subtended by the skew as projected on said envelope being substantially equal to the arc length corresponding to the angular pitch of the rotor teeth divided by an integer between two and four.

2. A motor according to claim 1, wherein one of said pluralities of teeth extends parallel to said axis.

3. A motor according to claim 2, wherein the rotor teeth are skewed relative to said axis and the stator teeth extend parallel to said axis.

4. A motor according to claim 2, wherein the stator teeth are skewed relative to said axis and the rotor teeth extend parallel to said axis.

5. A motor according to claim 1, wherein the rotor and stator teeth are skewed relative to the axis.

6. A motor according to claim 1, wherein said cylindrical portion includes two axially displaced segments each having a plurality of said rotor teeth, the teeth of said segments being oppositely magnetized by said magnetic field and the teeth of one segment being angularly displaced by one half tooth pitch relative to the teeth of the other segment.

7. A motor according to claim 6, wherein one of said pluralities of teeth extends parallel to said axis.

8. A motor according to claim 6, wherein the rotor teeth are skewed relative to said axis and the stator teeth extend parallel to said axis.

9. A motor according to claim 6, wherein the stator teeth are skewed relative to said axis and the rotor teeth extend parallel to said axis.

10. A motor according to claim 6, wherein the rotor and stator teeth are skewed relative to the axis.

11. A motor according to claim 1, wherein the stator teeth each project radially upon two rotor teeth.

12. A motor according to claim 6, wherein the stator teeth each project radially upon two rotor teeth.

13. A motor according to claim 1, wherein said integer is four.

14. A motor according to claim 1, wherein said permanent magnet means is mounted on the rotor assembly.

15. A motor according to claim 6, wherein said permanent magnet means is mounted on the rotor assembly.

16. A synchronous motor comprising, in combination,
    a rotor assembly including a cylindrical portion having an axis, said portion having a plurality of annularly spaced rotor teeth projecting radially to a cylindrical peripheral envelope on said axis,
    a stator assembly coaxial with said rotor assembly and having a plurality of radially projecting stator poles, said poles each having a plurality of stator teeth projecting radially toward said envelope, the stator teeth each projecting radially upon two rotor teeth,
    means for electrically energizing said stator poles,
    permanent magnet means in one of said assemblies for establishing a magnetic field at said rotor teeth, said rotor teeth and stator teeth each extending longitudinally along the stator poles and rotor portion, the plurality of rotor teeth and stator teeth being skewed relative to each other, the annular arc length subtended by the skew as projected on said envelope being substantially equal to the arc length corresponding to the angular pitch of the rotor teeth divided by an integer between two and four.

17. A synchronous motor comprising, in combination,
    a rotor assembly including a cylindrical portion having an axis, said portion including two axially displaced segments each having a plurality of annularly spaced rotor teeth projecting radially to a cylindrical peripheral envelope on said axis,
    a stator assembly coaxial with said rotor assembly and having a plurality of radially projecting stator poles, said poles each having a plurality of stator teeth projecting radially toward said envelope, the stator teeth each projecting radially upon two rotor teeth,
    means for electrically energizing said stator poles,
    permanent magnet means in one of said assemblies for establishing a magnetic field at said rotor teeth, said rotor teeth and stator teeth each extending longitudinally along the stator poles and rotor portion, the teeth of said segments being oppositely magnetized by said magnetic field and the teeth of one segment being angularly displaced by one half tooth pitch relative to the teeth of the other segment, the plurality of rotor teeth and stator teeth being skewed relative to each other, the annular arc length subtended by the skew as projected on said envelope being substantially equal to the arc length corresponding to the angular pitch of the rotor teeth divided by an integer between two and four.

* * * * *